(12) United States Patent
Lin

(10) Patent No.: US 8,324,890 B2
(45) Date of Patent: Dec. 4, 2012

(54) CLUTCH POSITION SENSOR FOR VEHICLE TRANSMISSION

(75) Inventor: Yingjie Lin, El Paso, TX (US)

(73) Assignee: Delphi Technologies, Inc., Troy, MI (US)

( * ) Notice: Subject to any disclaimer, the term of this patent is extended or adjusted under 35 U.S.C. 154(b) by 592 days.

(21) Appl. No.: 12/562,170

(22) Filed: Sep. 18, 2009

(65) Prior Publication Data

US 2011/0068775 A1   Mar. 24, 2011

(51) Int. Cl.
- *H01L 43/06* (2006.01)
- *G01B 7/14* (2006.01)
- *G01R 33/02* (2006.01)

(52) U.S. Cl. .................. 324/207.2; 324/207.24; 324/244

(58) Field of Classification Search ............... 324/207.2, 324/207.24, 244
See application file for complete search history.

(56) References Cited

U.S. PATENT DOCUMENTS

| | | | |
|---|---|---|---|
| 6,273,260 B1 * | 8/2001 | ColDepietro et al. | 206/532 |
| 6,576,890 B2 * | 6/2003 | Lin et al. | 250/231.14 |
| 6,806,702 B2 * | 10/2004 | Lamb et al. | 324/207.25 |
| 7,088,096 B2 * | 8/2006 | Etherington et al. | 324/207.24 |
| 7,170,278 B2 * | 1/2007 | Wohner | 324/207.24 |
| 7,439,732 B2 * | 10/2008 | LaPlaca | 324/207.25 |
| 7,583,079 B2 * | 9/2009 | Koike et al. | 324/207.25 |
| 2004/0007125 A1 * | 1/2004 | Stobrawe et al. | 92/5 R |
| 2004/0036467 A1 * | 2/2004 | May et al. | 324/207.15 |

* cited by examiner

*Primary Examiner* — Joshua Benitez Rosario
(74) *Attorney, Agent, or Firm* — Lawrence D. Hazelton

(57) ABSTRACT

A transmission clutch position sensor includes two Hall sensors located at opposite ends of a flux concentrator outside the casing of the transmission to sense a magnetic field generated by a magnet attached to the clutch piston. To reduce sensitivity to magnet-to-sensor gap tolerances, a ratio of the voltage of one Hall sensor to the sum of the voltages from both Hall sensors is used to correlate to the piston and, hence, clutch position.

9 Claims, 2 Drawing Sheets

US 8,324,890 B2

CLUTCH POSITION SENSOR FOR VEHICLE TRANSMISSION

I. FIELD OF THE INVENTION

The present invention relates generally to clutch position sensors for automotive vehicle transmissions.

II. BACKGROUND OF THE INVENTION

Modern automotive vehicles employ an engine transmission system having gears of different sizes to transfer power produced by the vehicle's engine to the vehicle's wheels based on the speed at which the vehicle is traveling. The engine transmission system typically includes a clutch mechanism which may engage and disengage these gears. The clutch mechanism may be operated manually by the vehicle's driver, or automatically by the vehicle itself based on the speed at which the driver wishes to operate the vehicle.

In automatic transmission vehicles, a need arises for the vehicle to sense the position of the clutch for smooth, effective shifts between gears in the transmission and for overall effective transmission control. Therefore, a clutch-position sensing component for sensing the linear position of the clutch must be used by automatic transmission vehicles to facilitate gear shifting and transmission control.

Current clutch-position sensing components utilize magnetic sensors. One advantage to using magnetic sensors is that the sensor need not be in physical contact with the object being sensed, thereby avoiding mechanical wear between the sensor and the object. However, actual linear clutch measurement accuracy may be compromised when the sensor is not in physical contact with the sensed object because of a necessary gap or tolerance that exists between the sensor and the object. Moreover, current sensing systems addressing this problem use coils and certain application-specific integrated circuits which are relatively expensive.

SUMMARY OF THE INVENTION

Accordingly, an apparatus has a magnet disposable inside an engine transmission casing and movable by an engine clutch mechanism in the casing as the engine clutch mechanism moves. A flux concentrator is disposable outside the engine transmission casing to concentrate magnetic flux from the magnet, and a first Hall sensor is juxtaposed with the flux concentrator for generating a first signal in response to a magnetic field. Additionally, a second Hall sensor is juxtaposed with the flux concentrator for generating a second signal in response to a magnetic field. A position determination circuit receives the first and second signals and based thereon outputs a signal representative of a linear position of the engine clutch mechanism.

In some embodiments the flux concentrator is elongated and defines first and second ends, with the first Hall sensor being juxtaposed with the first end and the second Hall sensor being juxtaposed with the second end. If desired, a first magnetic booster and a second magnetic booster can be provided. The first Hall sensor may be disposed between the first end of the flux concentrator and the first magnetic booster, and the second Hall sensor may be disposed between the second end of the flux concentrator and the second magnetic booster.

The flux concentrator can be made of a soft magnetic material. The magnet is disposed inside the transmission casing and is coupled to the engine clutch mechanism. On the other hand, the flux concentrator and Hall sensors typically are disposed outside the casing. In non-limiting implementations the flux concentrator tapers inwardly to the first and second ends as do the boosters.

In another aspect, an apparatus has a position sensor disposed outside a transmission casing and bearing a distance within a tolerance from a moving part in the transmission whose position is sought to be measured with a desired degree of accuracy regardless of where in the tolerance the sensor is located relative to the part. The position sensor includes plural sensing elements whose individual outputs representing position of the part are affected by the location of the sensor within the tolerance. The sensor also includes a position determination member receiving the signals from the sensing elements and combining the signals in a way that produces a signal representative of the position of the part that is less affected by the location of the sensor within the tolerance than are the signals from the sensing elements.

In another aspect, a method includes receiving first and second signals from first and second Hall sensors, respectively. The signals represent a position of a moving part. The method includes determining a ratio in which a numerator is derived from only one of the signals, or from a difference between the signals, and the denominator is a sum derived from both of the signals. Position of the moving part is indicated using the ratio.

DETAILED DESCRIPTION OF THE PREFERRED EMBODIMENT

The present invention is intended for application in automotive transmission systems and will be described in that context. It is to be understood, however, that the present invention may also be applied to other applications and contexts requiring non-contact linear position sensors.

Figure 1:
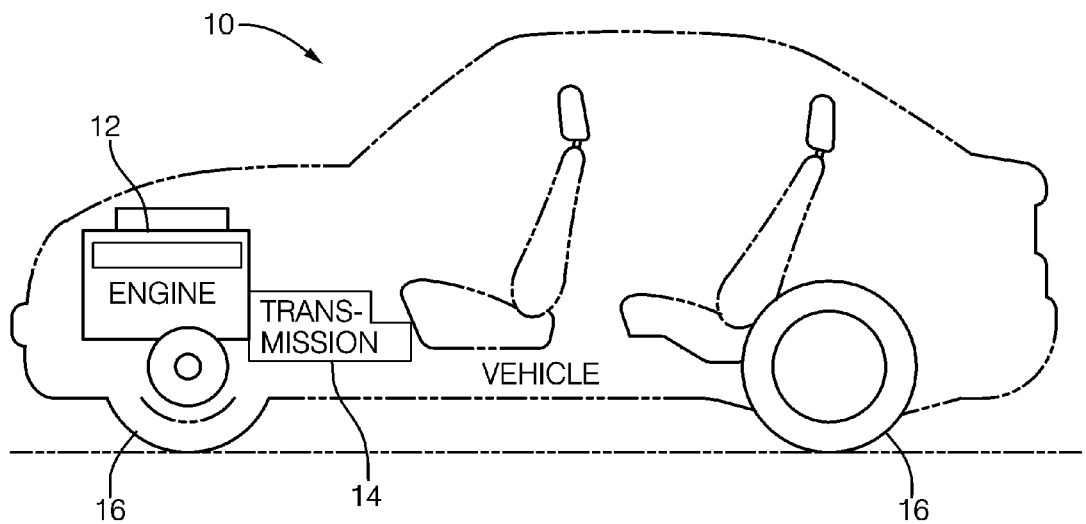
FIG. 1 is a schematic view of a vehicle that can use the present clutch position sensor.

Beginning initially with FIG. 1, a schematic view of an automotive vehicle is shown. The automotive vehicle 10 has an engine 12 and an engine transmission 14. It is to be understood that the engine transmission 14 has a clutch capable of engaging transmission gears by means known within the art. Further, the engine transmission 14 is understood to employ a clutch position sensor described further below. The vehicle 10 also has plural wheels 16 so that the vehicle 10 may be mobile.

Figure 2:
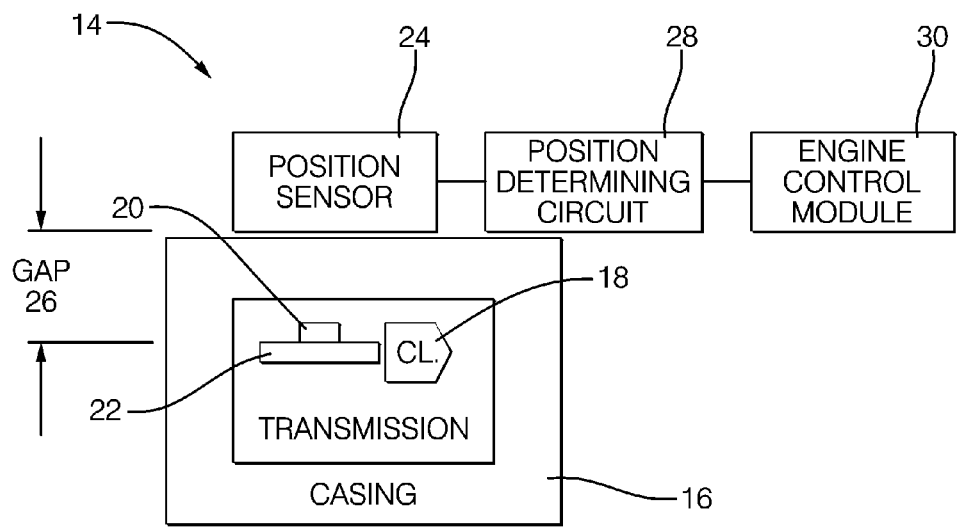
FIG. 2 is a schematic view of a transmission, showing parts related to present principles.

Now referencing FIG. 2, a schematic view of an engine transmission is shown. The engine transmission 14 is surrounded by an engine transmission casing 16, the casing 16 being made of a metal such as aluminum (or any non-magnetic material) in non-limiting embodiments. Additionally, the engine transmission 14 includes a clutch mechanism 18.

A magnet 20 is also shown in FIG. 2. The magnet 20 is disposed inside the casing 16 and is coupled to the engine clutch mechanism 18. The magnet 20 can be particularly coupled to a moving part 22 of the clutch mechanism 18. The moving part 22 may be a transmission clutch component such as a piston that moves a transmission clutch in non-limiting embodiments. Moreover, the clutch component may have a movement range in excess of 25 millimeters in non-limiting embodiments. However, it is to be understood herein that the magnet 20 may be placed on any acceptable moving part of the clutch mechanism 18 as determined by those skilled in the art.

Continuing with FIG. 2, a transmission clutch position sensor 24 is disposed outside the casing 16 and is capable of sensing a magnetic field generated by the magnet 20. It is to be understood that the sensor 24 is relatively inexpensive and preferably does not include a coil, including any type of electro-magnetic coil. The sensor 24 will be described in greater detail in FIGS. 3 and 4.

The position sensor 24 disposed outside a transmission casing 16 bears a gap distance 26 within a tolerance from the moving part 22. In non-limiting embodiments, the normal gap 26 may be anywhere from 5 millimeters up to 30 millimeters. After the sensor being calibrated at the normal gap, the sensor 24 may still output relatively constant measurements of the relatively large linear position of the moving part 22 at particular times based on the magnetic field generated by the magnet 20 regardless of where in the few millimeters tolerance of the gap the sensor is disposed. Further, the position sensor 24 may include plural sensing elements that will be functionally described in greater detail in FIGS. 3 and 4.

Still in reference to FIG. 2, the position sensor 24 is electrically connected at least one position determining circuit 28. The circuit 28 receives signals from the position sensor 24 and outputs a signal to an engine control module 30 indicating the linear position of the engine clutch mechanism 18. The method of calculation for the linear position of the mechanism 18 will be described in greater detail below. The engine control module 30 is understood to be electronically connected to the circuit 28 and may use the linear position information in conjunction with vehicle operation in non-limiting embodiments to establish demanded clutch positions.

Figure 3:
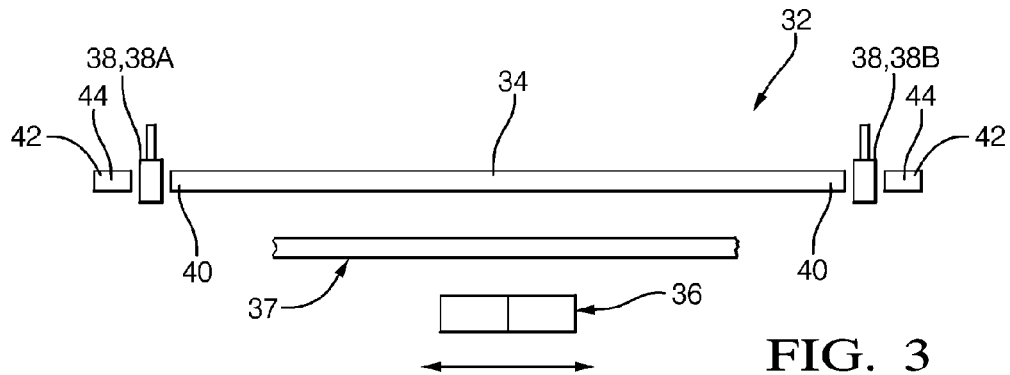
FIG. 3 is a schematic view an example embodiment of the sensor.

Now referencing FIG. 3, a schematic view of an example embodiment of a position sensor is shown. It is to be understood that a sensor 32 may be disposable outside an engine transmission casing 37 and is substantially similar in function and configuration to the sensor 24 described above. Thus, FIG. 3 shows particular elements of a sensor 32 for the current embodiment.

The sensor 32 has at least one elongated flux concentrator 34 which may concentrate magnetic flux generated by a magnet 36 coupled to a moving part inside the transmission casing 37, the magnet 36 being substantially similar in function and configuration to the magnet 20 described in FIG. 2. Moreover, the flux concentrator 34 may be made of a soft magnetic material such as ferrite ceramic, magnet annealed NiFe, etc.

FIG. 3 also shows plural sensing elements 38, for example a first Hall sensor 38A and a second Hall sensor 38B, which are closely juxtaposed with respective ends 40 of the flux concentrator 34. It is to be understood that the sensing elements may be, without limitation, Hall sensors. It is to be further understood that each of the sensing elements 38 is capable of generating a signal or output in response to a magnetic field generated by the magnet 36 and concentrated onto the sensors by the flux concentrator.

Thus, the plural sensing elements 38, which may be Hall sensors in non-limiting embodiments, may each yield a signal or output representing the linear position a moving part, similar to the moving part 22 described in FIG. 2, which is measured based on the magnetic field created by movement of the magnet 36. Accordingly, the individual outputs are received by the position determination circuit, which combines the signals in a way (described below) that produces a signal representative of the actual position of a moving part that is relatively unaffected by the location of the sensor 32 within a gap or tolerance.

Still describing FIG. 3, the sensor 32 may also have plural magnetic boosters 42 which have respective ends 44 facing each booster's respective sensing element 38 in non-limiting embodiments. Accordingly, each of the sensing elements 38 may be disposed between a respective end 40 of the flux concentrator 34 and a respective end 44 of a magnetic booster 42. The relative position of the sensing elements 38 between ends 40 and 44 will be described further in FIG. 4.

Figure 4:
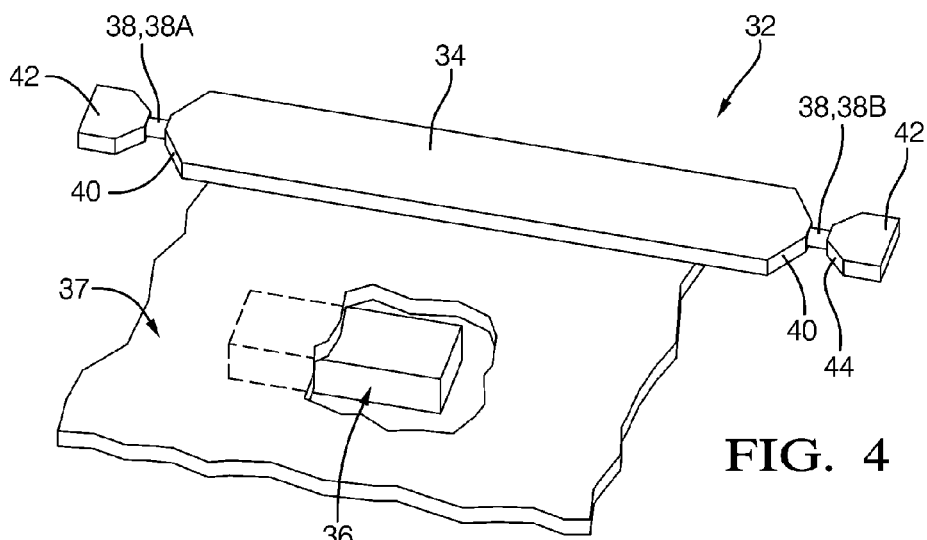
FIG. 4 is a perspective view of an example embodiment of the sensor.

Now referencing FIG. 4, a perspective view of an example embodiment of the sensor 32 also described in FIG. 3 is shown. From the perspective view shown in FIG. 4, it may be appreciated that the flux concentrator 34 tapers inwardly toward the ends 40. It may be further appreciated that the magnetic boosters 42 taper inwardly toward their respective ends 44 that face their respective sensing elements 38. These inward tapers may increase the ability of the sensing elements 38 to sense a magnetic field strength.

Figure 5:
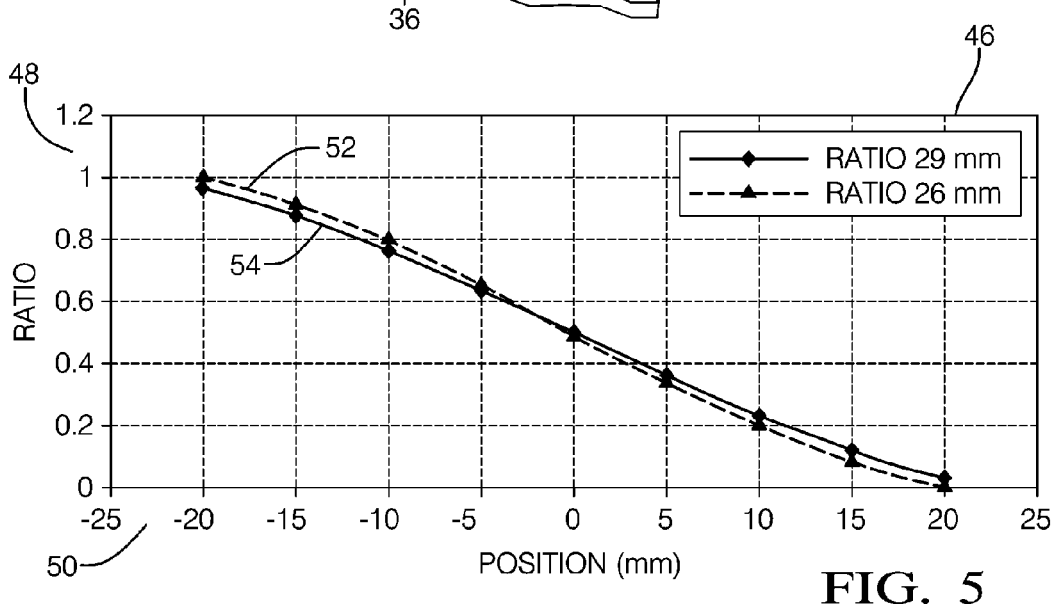
FIG. 5 is a graph showing voltage ratios versus clutch positions.

Continuing now in reference to FIG. 5, a graph showing magnetic field intensity ratios versus clutch positions is shown. The graph 46 shows magnetic field intensity ratios which are based on the magnetic field intensity from one position sensor divided by the sum of the magnetic field intensity from both sensors. Also, the ratio could be that the magnetic field intensity difference between the two sensors over the sum of the magnetic field intensity of both sensors.

In other words, the ratios used in the graph 46 are determined by a numerator which is derived from only one of the signals of a position sensor or the difference between both sensors and a denominator which is the sum derived from both signal of the position sensors. This ratio may then be used to indicate the position of a moving part to within a certain degree of accuracy (preferably 3-5% of the actual position of the moving part) such as the piston of a clutch mechanism inside a vehicle transmission in non-limiting embodiments. The ratio thus allows an accurate measurement of the position of the moving part irrespective of where in the tolerance a position sensor may be, such as sensor 24 referenced in FIG. 1 (i.e. despite a gap such as the gap 26 in FIG. 1).

The position indicated by the ratio may then be used by a vehicle, particularly by an engine control module in a vehicle, to control a subsequent position of the moving part in non-limiting embodiments. Thus, the graph shows voltage ratios ranging from 0 to 1.2 in the vertical column 48 and magnet positions ranging within a 50 millimeter range in the horizontal column 50. The graph line 52 represents the sensor output when the Hall sensors are 26 mm from the magnet, whereas graph line 54, which is nearly coterminous with graph line 52, shows sensor output when the Hall sensors are 29 mm from the magnet.

While the particular CLUTCH POSITION SENSOR FOR VEHICLE TRANSMISSION is herein shown and described in detail, it is to be understood that the subject matter which is encompassed by the present invention is limited only by the claims.

What is claimed is:

1. Apparatus comprising:
    at least one magnet disposable inside an engine transmission casing and being movable by an engine clutch mechanism in the casing as the engine clutch mechanism moves;
    at least one flux concentrator disposable outside the engine transmission casing to concentrate magnetic flux from the magnet;

at least a first Hall sensor juxtaposed with the flux concentrator and generating a first signal in response to a magnetic field;

at least a second Hall sensor juxtaposed with the flux concentrator and generating a second signal in response to a magnetic field; and at least one position determination circuit receiving the first and second signals and based thereon outputting a signal representative of linear position of the engine clutch mechanism, wherein the position determination circuit combines the first signal and second signal such that the signal representative of the linear position of the clutch mechanism is less affected by variation in a spacing gap between the flux concentrator and magnet than are the individual signals from the first Hall sensor and the second Hall sensor.

2. The apparatus of claim 1, wherein the flux concentrator is elongated and defines first and second ends, the first Hall sensor being juxtaposed with the first end and the second Hall sensor being juxtaposed with the second end.

3. The apparatus of claim 2, further comprising a first magnetic booster and a second magnetic booster, the first Hall sensor being disposed between the first end of the flux concentrator and the first magnetic booster, the second Hall sensor being disposed between the second end of the flux concentrator and the second magnetic booster.

4. The apparatus of claim 3, wherein the magnetic boosters both taper inwardly to respective ends that face the respective Hall sensor.

5. The apparatus of claim 2, wherein the flux concentrator tapers inwardly to the first and second ends.

6. The apparatus of claim 1, wherein the flux concentrator is made of a soft magnetic material.

7. The apparatus of claim 1, further comprising the engine transmission casing, the magnet being disposed inside the casing and coupled to the engine clutch mechanism, the flux concentrator and Hall sensors being disposed outside the casing.

8. The apparatus of claim 1, wherein the position determination circuit determines the signal representative of linear position based on a ratio of either the first signal or the second signal over the sum of the first signal and second signal.

9. The apparatus of claim 1, wherein the position determination circuit determines the signal representative of linear position based on a ratio of the difference between the first signal and the second signal over the sum of the first signal and second signal.

\* \* \* \* \*